Patented Nov. 23, 1937

2,100,054

UNITED STATES PATENT OFFICE 2,100,054

ANESTHETIC TANNATE

Russell Hopkinson and Alexander V. Tolstoouhov, New York, N. Y., assignors to Ostro Research Laboratories, Inc., New York, N. Y., a corporation of New Jersey No Drawing. Application October 27, 1933, Serial No. 695,506

4 Claims. (Cl. 167—52)

This invention relates to new compounds and compositions useful in the treatment of scalds, burns, denuded surfaces and other painful lesions of the skin or mucous membranes, and to the process of producing them.

Picric acid has been in use for a long time as a disinfectant and protein precipitant in the treatment of burns, usually in the form of a water solution. It has some anesthetic properties which are of course of great benefit in the treatment of burns. However, it has several drawbacks, the most important of which is a relatively high general toxicity, especially when used on large areas. It also produces some local irritation to the tissue cells due to the fact that it is a fairly strong acid. Furthermore, it produces an objectionable yellow color to the skin which is difficult to remove.

Local anesthetics in an oily base or carrier have been used for some time in the treatment of burns principally for the purpose of relieving pain, and it has been proposed heretofore to combine these two forms of treatment by the use of the picrates of certain local anesthetics. (U. S. 1,596,259.)

Now we have discovered that the tannates of certain local anesthetics exhibit a number of properties which render them vastly superior to the picrates in the treatment of burns or other painful lesions. We have also discovered a simple method whereby these tannates, which heretofore have not been known, can be prepared in a sufficiently pure state to enable them to be used with safety.

Tannic acid has heretofore been used chiefly as an astringent for mucous membranes of the mouth and intestinal tract and as an astringent and disinfectant in the preparation of the skin of patients or hands of surgeons for surgical operations. It has also been used for the treatment of burns with good results.

Tannic acid has a very low general toxicity. It is completely oxidized in the body, whether taken by mouth or intravenously. This low general toxicity of tannic acid gives it a very important advantage in comparison with picric acid. Picric acid has the disadvantage that it is sooner or later absorbed in the body and causes poisoning. This disadvantage is not present with tannic acid as it forms protein tannates which act as a protection. These tannates have no poisonous properties. Tannic acid has also bactericidal properties. The combination of astringent and antiseptic properties together with negligible toxicity make tannic acid very useful for the human being.

In cases of painful burns, ulcers, hemorrhoids, etc., it is desirable to add anesthetic action to the astringent and antiseptic properties of tannic acid. This can be accomplished by combining tannic acid and local anesthetics, or by making salts thereof that have all these desirable properties. Tannates of local anesthetics generally are fairly insoluble at the pH of body fluids. This property increases the length of action of anesthetics and decreases their general toxicity, so that they are safe for use on large areas.

The salts of anesthetics and tannic acid are soluble in acid media at pH of about 3.0–4.0. The pH at which tannates of different anesthetics are soluble varies widely. For the maximum activity of both the tannic acid and anesthetics the reaction of the solutions or ointments containing them should be just sufficient to prevent the formation of a heavy precipitate. This can be obtained either by adding a definite excess of tannic acid to the solutions, or by adding an acid salt of phosphoric or some other weak acid, such as citric acid, tartaric or phthalic acid.

Tannates of anesthetics can be isolated only when the pH of the solutions are above certain figures. Usually when solutions of hydrochlorides of local anesthetics and tannic acid are mixed the pH of the solutions are too low to give precipitation of the salt or tannate that is formed. This may possibly explain why such salts have not previously been prepared.

Tannates of local anesthetics may be prepared in accordance with the present invention either by mixing an alcohol solution of a local anesthetic in the form of the free base and a solution of tannic acid, or by mixing an aqueous solution of a local anesthetic hydrochloride and an aqueous solution of tannic acid. Other solvents can also be used instead of alcohol or water. To isolate the tannates in dry form, it is preferable to use the aqueous solutions and adjust the pH in each particular case so as to give the maximum precipitation of the tannate consistent with purity of the product. The pH is adjusted by adding an alkali, such as sodium hydroxide, for example. The precipitated tannate may be removed by filtering and is then dried.

In carrying out this invention it has been found that tannates that are produced by causing tannic acid to react with local anesthetics that have basic properties are very effective. We have also found that tannates produced by causing tannic acid to react with local anesthetics that have basic properties due to the fact that they contain an amino group or a substituted amine are particularly useful in treating burns and other skin lesions. More particularly, local anesthetics that have basic properties and have an aromatic nucleus, such as a naphthalene nucleus and others, can be used to form the tannate when reacted with tannic acid, thus producing products very useful for the purposes of this invention.

The tannates of anesthetics prepared in accordance with this invention can be incorporated into ointments, suppositories, pastes, etc. We prefer to use 1 to 5% by weight of the tannate in such vehicles depending on the strength of the particular local anesthetic that is used in making the tannate.

The following are given for illustrative purposes as specific examples for preparing the tannates of some local anesthetics, but it is to be understood that the invention is not restricted to these examples.

*Example 1.*—Preparation of 1-ethoxy-4-(beta-diethyl-amino-ethyl)-naphthalene tannate:

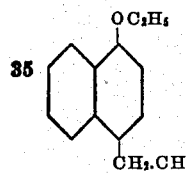

CH₂.CH₂.N(C₂H₅)₂.HO.OC(OH)₂.C₆H₂.O.OC.C₆H₂.(OH)₃

Dissolve 1.5 gm. of tannic acid (2 mols) in 100.0 cc. of H₂O and 0.9 gm. of 1-ethoxy-4-(beta-diethyl-amino-ethyl)-naphthalene-hydrochloride (1 mol.) in 25.0 cc. of H₂O. Mix the solutions and add 25.0 cc. of N/10 NaOH to bring the pH of solution to 4.6. Filter the precipitate that is formed, wash with H₂O and dry in vacuo. As an alternative, powdered tannic acid and hydrochlorides of anesthetics can be dissolved together and N/10 NaOH can be added to the mixture afterwards. The yield is 92% of the theoretical yield.

The precipitate or tannate is a light, creamy powder that is difficultly soluble in H₂O, alcohol, and weak alkalies and is soluble in dilute acids. The melting point is 115–117° C. If the pH of the solution from which the precipitate is formed by adding the alkalies is above 4.6 the precipitate turns purplish brown soon after it is formed.

The smallest visible precipitation of salt starts from N/100 solutions of the anesthetic hydrochloride and free tannic acid at about pH 3.53. Maximum precipitation of the salt takes place at about pH 4.55.

*Example 2.*—Preparation of diethyl-amino-ethyl ester of p-amino benzoic acid tannate or

H₂N.C₆H₄.COO.(CH₂)₂.N(C₂H₅)₂.
HO.OC.(OH)₂.C₆H₂.O.OC.C₆H₂.(OH)₃

Dissolve 1.5 gm. of tannic acid (2 mols) and 0.87 gm. of procaine hydrochloride (1 mol.) in 100 cc. of H₂O, add 20.0 cc. of N/10 NaOH to bring the pH of the solution to 6.0. Filter the precipitate which forms, wash a few times with H₂O and dry in vacuo.

The precipitate is a brownish powder that is very difficultly soluble in H₂O, alcohol, and weak alkalies, but is soluble in dilute acids. Its melting point is 107–109° C.

The smallest visible precipitation of salt starts from N/100 solutions of the hydrochloride of this anesthetic and free tannic acid at about pH 4.38. Maximum precipitation takes place at about pH 7.08.

*Example 3.*—Preparation of α-butyloxycinchoninic acid diethyl-ethylenediamide tannate:

CO.NH.CH₂.CH₂.N(C₂H₅)₂.HO.CO.(OH)₂.C₆H₂.O.CO.C₆H₂.(OH)₃

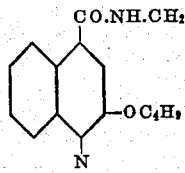

—OC₄H₉

This tannate can be prepared in a similar way, i. e., by dissolving 2 mols of α-butyloxycinchoninic acid diethyl-ethylenediamide hydrochloride and 1 mol. of tannic acid in 100 cc. of water and adding NaOH. The pH of the solution should not be above 5.0. At higher pH the yields are higher, but the salt is not stable. The salt obtained at this higher pH turns to a dark brown color.

This tannate is a brown powder. It is difficultly soluble in water, alcohol, and weak alkalies, and it is soluble in weak acids. Its melting point is 94–96° C.

The smallest visible precipitation of salt starts from N/100 solutions of the hydrochloride of this anesthetic and free tannic acid at about pH 3.64. Maximum precipitation takes place at about pH 6.16.

*Example 4.*—Preparation of the tannate of methyl ethyl dimethylamino-methyl carbinol benzoate (stovaine).

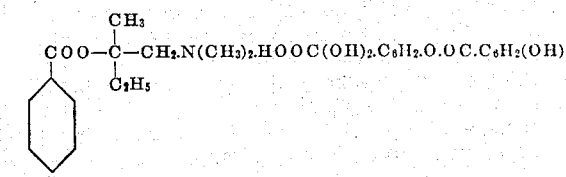

Dissolve 1.5 gm. of tannic acid (2 mols) and 0.52 gm. of stovaine hydrochloride (1 mol.) in 100 cc. of water. To precipitate the tannate add $$\frac{N}{10} NaOH$$

to bring the pH to 5.22. Filter the precipitate that is formed, wash with water and dry in vacuo.

The tannate is a light creamy powder that is very poorly soluble in water, alcohol, and weak alkalies, but is soluble in dilute acids.

The smallest visible precipitation of the salt starts from $$\frac{N}{100}$$

solutions of the anesthetic hydrochloride and free tannic acid at about pH—4.69. Maximum precipitation of this salt takes place at about pH 5.22. The tannate melts at 95°–100° C. with decomposition.

*Example 5.*—Preparation of the tannate of ethenyl-p-diethoxydiphenylamidine (holocaine).

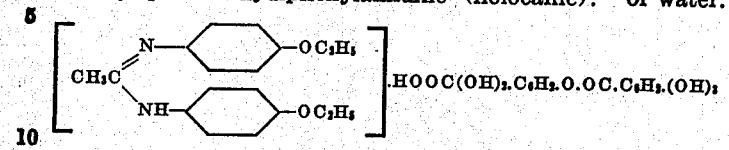

Dissolve 1.5 gr. of tannic acid (2 mols) plus 0.69 gms. of ethenyl-p-diethoxydiphenylamidine hydrochloride (1 mol.) in 100 cc. of water. To precipitate the tannate add

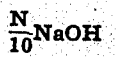NaOH to bring the pH to 4.98. Filter the precipitate that is formed, wash with water and dry in vacuo.

The tannate is a light creamy powder that is very poorly soluble in water, alcohol, and weak alkalies, but is soluble in dilute acids.

The smallest visible precipitation of the salt starts from

solutions of the anesthetic hydrochloride and free tannic acid at about pH 4.20. Maximum precipitation of salt takes place at about pH 4.98. The tannate melts at 150°–155° with decomposition.

For application to painful lesions, the tannates described above, and other similar tannates, can be dissolved in water that is slightly acidified; or they may be incorporated into ointments by methods well-known in the art; or they may be incorporated in a "greaseless cream". We prefer to use about 1 to 5% of the tannate in any of the above bases or carriers.

A particularly useful ointment for serious burns, scalds, etc. can be prepared by mixing 2 parts by weight of 1-ethoxy-4-(beta-diethyl-amino-ethyl)-naphthalene tannate, 90 parts white vaseline and 10 parts lanolin. 2 parts of tannic acid may be added to the above if desired.

A very satisfactory cream for the treatment of sunburn can be prepared by mixing one or two parts by weight of 1-ethoxy-4-(beta-diethyl-amino-ethyl)-naphthalene tannate with 20 parts of glycerol mono stearate and 80 parts of water at 70° C. and allowing the mixture to cool while stirring. This produces a cooling greaseless cream having a neutral reaction. Several parts of vaseline, lanolin or petrolatum may be added to the above if desired.

Occasionally, physicians prefer in the treatment of large burns to use an aqueous solution and to leave the areas uncovered until the natural formation of a protective covering. An excellent wash can be prepared for this purpose by dissolving one part by weight of 1-ethoxy-4-(beta-diethyl-amino-ethyl)-naphthalene tannate and two parts of tannic acid in 100 parts of water. An alternative method is to dissolve one part of the hydrochloride of the local anesthetic and five parts of tannic acid in 200 parts of water. Part of the tannic acid is immediately used to form the tannate. The advantage of this second method is ease of preparation. This solution can be applied to the denuded area by means of tampons or swabs.

In addition to the advantage which the tannates of local anesthetics have over the corresponding picrates in being non-toxic, colorless and non-staining, there is another important advantage. Tannic acid is an oxygen absorbent and therefore acts to prevent the decomposition of the readily oxidizable local anesthetics when exposed to air. On the other hand, picric acid does not prevent this oxidation. The tannates of local anesthetics have been found to be much more stable than the corresponding picrates.

Examples of other local anesthetics, the tannates of which are useful in the treatment of burns, denuded areas and other painful lesions are:

Cocaine
Tropacocaine
Trimethyl-benzoxy-piperidine (eucaine)
Benzoxy-dimethylamino-methyl dimethyl-amino butane (alypine)
p-Amino-benzoyl dimethyl-amino-methyl-butanol (tutocaine)
p-Amino-benzoyl-gamma-dinormal-butyl-amino propanol (butyn).

We claim:

1. A composition for treating skin lesions having therein a compound in the list consisting of 1-ethoxy-4-(beta-diethyl-amino-ethyl)-naphthalene tannate, diethyl-amino-ethyl ester of p-amino benzoic acid tannate, α-butyloxy cinchoninic acid diethyl-ethylenediamine tannate, methyl ethyl dimethylamino-methyl carbinol benzoate tannate, ethenyl-p-diethoxydiphenylamidine tannate, tropacocaine tannate, trimethyl-benzoxy-piperidine tannate, benzoxy-dimethyl-amino-methyl dimethyl-amino butane tannate, p-amino-benzoyl dimethyl-amino-methyl-butanol tannate, and p-amino-benzoyl-gamma-dinormal-butylamino propanol tannate.

2. A composition for treating skin lesions having therein 1-ethoxy-4-(beta-diethyl-amino-ethyl)-naphthalene tannate.

3. A composition for treating skin lesions having therein diethyl-amino-ethyl ester of p-amino benzoic acid tannate.

4. A composition for treating skin lesions having therein α-butyloxy cinchoninic acid diethyl-ethylenediamide tannate.

RUSSELL HOPKINSON.
ALEXANDER V. TOLSTOOUHOV.